L. BISSELL.
REVOLVING HORSE-RAKE.
No. 189,992. Patented April 24, 1877.
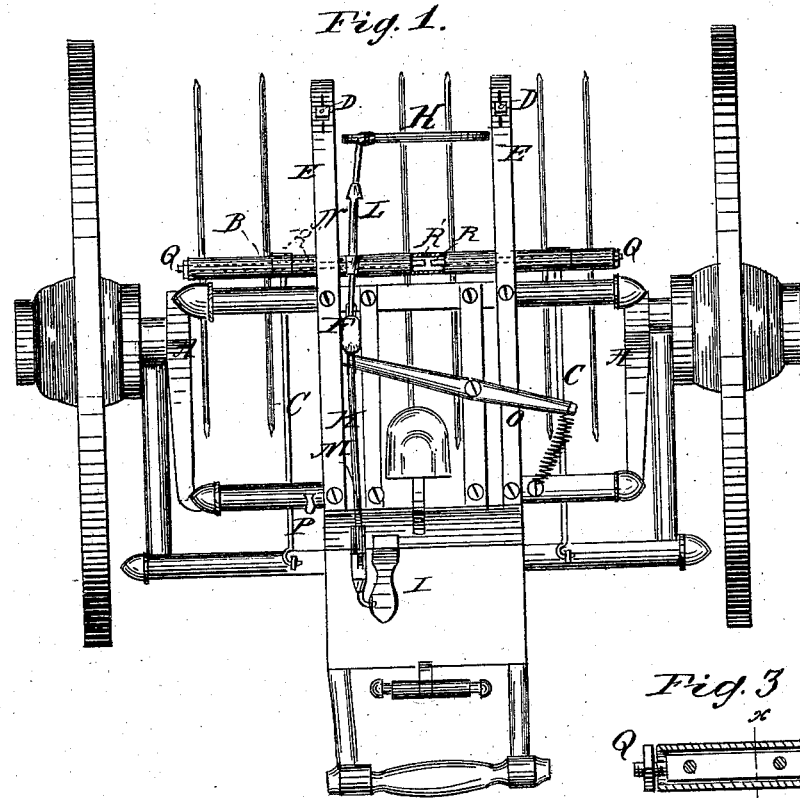
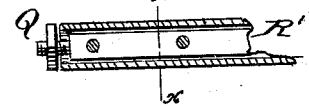
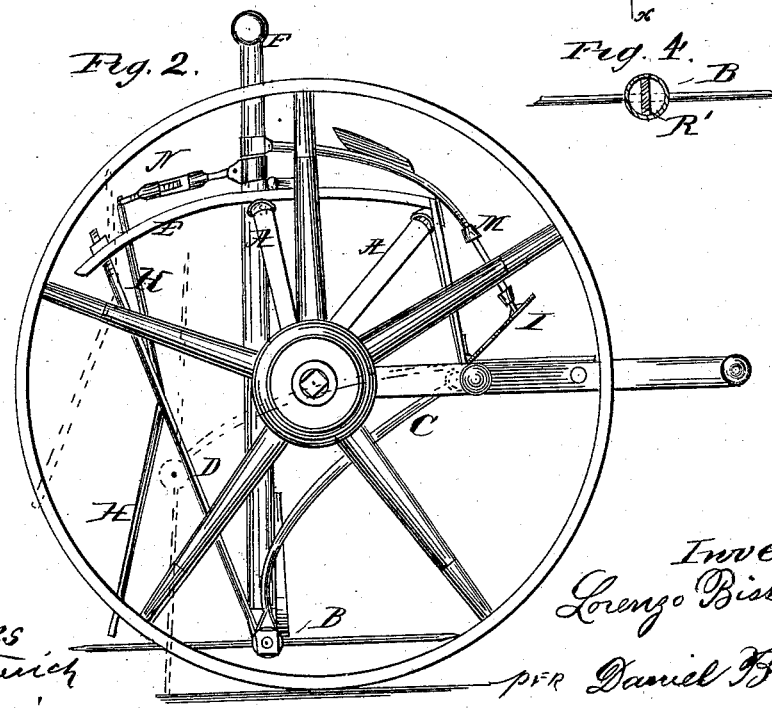
Witnesses
Inventor
Lorenzo Bissell
per Daniel Breed
Atty.

UNITED STATES PATENT OFFICE.

LORENZO BISSELL, OF GHENT, OHIO.

IMPROVEMENT IN REVOLVING HORSE-RAKES.

Specification forming part of Letters Patent No. 189,992, dated April 24, 1877; application filed September 15, 1876.

*To all whom it may concern:*

Be it known that I, LORENZO BISSELL, of Ghent, in the county of Summit and State of Ohio, have invented certain new and useful Improvements in Horse Hay-Rakes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

In the accompanying drawings, Figure 1 is a top view of my improved horse hay-rake. Fig. 2 is a side view of the same.

My invention consists in a novel construction and arrangement of devices for holding, revolving, and elevating the rake, and in other improvements, all of which will be fully understood by the following description.

The frame of the machine is very light, and yet sufficiently strong, and is supported on elevated arms extending upward from the axle, as seen at A, Fig. 2 of the drawings.

The revolving rake B is provided with drag-rods C, in the usual manner, and also with brace-rods D, the upper ends of which slide in slots in the arms E of the frame.

The head of the rake is hollow, being made of a piece of common gas-tube. The teeth are fastened into this hollow head by means of the two rods R R', which are provided with nuts Q, Figs. 3 and 4, at the ends of the head. If a tooth should be broken or bent the burr may be removed from the rod, and then the tooth may be removed and repaired.

An elevating-lever, F, is hinged to the axle of the rake, and carries two brace-rods, D, which rest upon the rake-teeth to steady the same while filling the rake with hay. A trip, H, is arranged to lock the rake in working position. This trip is released by means of the treadle I and the two rods K and L, both of which are atttached to the lever F, and provided with adjusting-screws M and N, to increase or diminish the length of these rods at pleasure. A spring-lever, O, presses against the front of the lever F, which is thus pushed back in order to move the trip H, and promptly catch the rake after it makes a half-revolution.

When the driver desires to raise the rake out of working position, he lets it revolve until it rests on the ends of the teeth, and then catches it by slipping in the pin P through the lever F above the frame of the machine, and thus supports the rake clear of the ground, as in traveling from field to field.

Having thus described my invention, I claim—

1. The above-described arrangement and combination of the rake B, brace-rods D, slotted arms E, drag-rods C, and elevating-lever F, substantially as and for the purposes set forth.

2. The hollow rake-head, in combination with the perforated rods R R', having burrs Q, for the purpose of fastening the rake-teeth, substantially as set forth.

In testimony that I claim the foregoing as my own I affix my signature in presence of two witnesses.

LORENZO BISSELL.

Witnesses:
M. D. PRATT,
OLIVER P. ROBINSON.